Feb. 6, 1934.  E. R. BURGHER  1,946,012
APPARATUS FOR OBTAINING AN AVERAGE OF READINGS ON CIRCULAR CHARTS
Filed Feb. 25, 1933

Inventor:
EARL R. BURGHER,
by
his Attorneys.

Patented Feb. 6, 1934

1,946,012

UNITED STATES PATENT OFFICE 1,946,012

APPARATUS FOR OBTAINING AN AVERAGE OF READINGS ON CIRCULAR CHARTS

Earl R. Burgher, Cleveland, Ohio

Application February 25, 1933. Serial No. 658,607

2 Claims. (Cl. 88—14)

This invention relates to an apparatus for obtaining an average of readings on circular charts.

One object of the present invention is to provide a novel and inexpensive apparatus for obtaining a very rapid average of readings on circular charts.

This and further objects will appear after referring to the drawing, in which.

Figure 1:
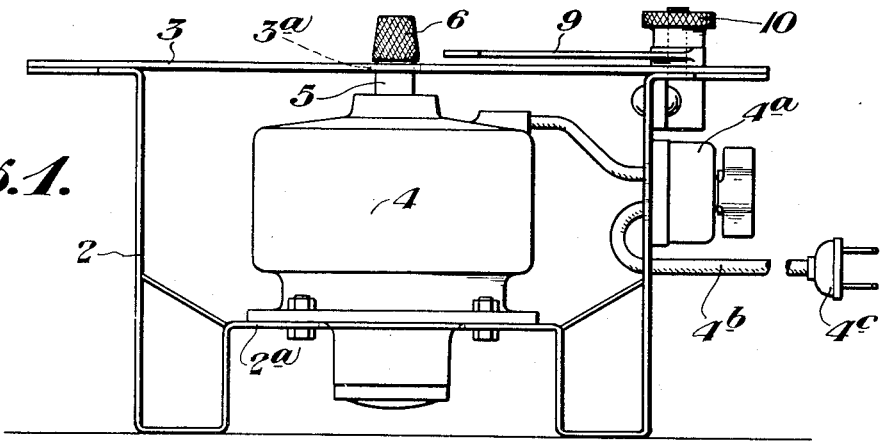
Figure 1 is an elevation of the apparatus of the invention.
Figure 2:
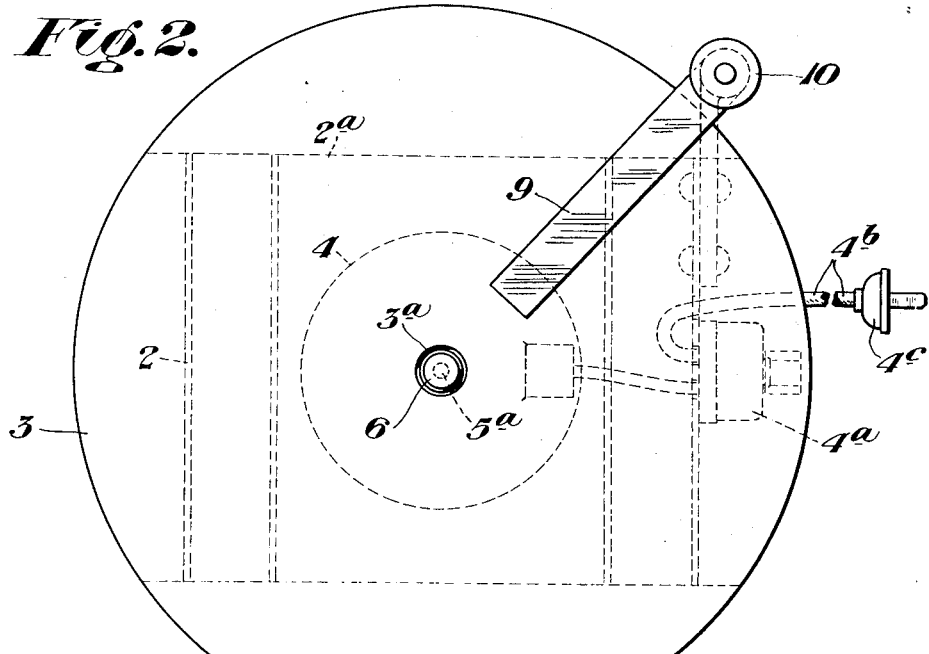
Figure 2 is a plan thereof.

Referring more particularly to the drawing, the numeral 2 designates a support for the apparatus of the invention. The support 2 is provided with a raised portion 2a and a circular plate 3, which is secured to the uppermost part thereof in any suitable manner. An electric motor 4 is secured to the raised portion 2a of the support, and is provided with a vertical shaft 5 which extends through an aperture 3a in the plate 3. The electric motor 4 is further provided with a suitable switch 4a, which is mounted on the support 2, and a suitable power connection such as the cable 4b and the plug-in terminal 4c.

The shaft 5 of the electric motor 4 terminates slightly above the aperture 3a and is provided with a centrally disposed screw 5a. A nut 6 is provided for the screw 5a and carries a screw washer 6a which has an outer surface extending beyond that of the nut 6. The washer 6a is adapted to seat in the centrally disposed aperture in a circular chart, while the nut 6 is adapted to clamp the chart on the end of the motor shaft 5.

A suitable hand-rest 9 is pivoted to the support 2 and provided with a knurled nut 10 for securing the same in adjusted position over the circular plate 3.

In operation, a circular chart 12 is clamped to the upper end of the motor shaft 5 by means of the nut 6, and the electric motor 4 is energized to rotate the shaft at a relatively high rate of speed.

Figure 4:
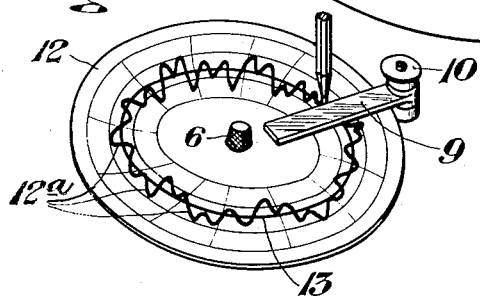
Figure 4 is a perspective showing the device of the invention in operation.
Figure 3:
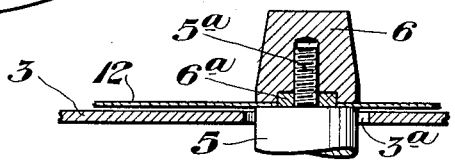
Figure 3 is a sectional detail view of a part of the apparatus.

The readings on the chart, which are generally indicated at 12a in Figure 4 will, due to the rotation thereof, assume the aspect of a circle having lightly and heavily marked portions. The heavily marked portion of the circle will, of course, indicate that portion on the chart on which most of the readings occur, and accordingly the hand-rest 9 is moved over the face of the chart and secured in adjusted position by means of the knurled nut 10. With the aid of the hand-rest 9, a pencil point or other marking medium is placed in contact with the darkest portion of the readings on the surface of the chart, and will result in a fine line 13 at the point of the average of the readings.

While I have shown and described one specific embodiment of my invention it will be understood that I do not wish to be limited exactly thereto, since various modifications may be made without departing from the scope of my invention, as defined in the following claims.

I claim:

1. Apparatus for obtaining a mean average of readings on a circular chart comprising a support, a stationary plate having a centrally disposed aperture mounted on said support, a rotatable shaft associated with said support and extending through said aperture, means associated with said shaft for supporting a circular chart adjacent said plate, means for rotating said shaft, a hand-rest arranged for pivotal movement across the face of said chart, and means for locking said hand-rest against movement.

2. Apparatus for obtaining an average of readings on a circular chart comprising a support, a stationary plate having a centrally disposed aperture mounted on said support, a motor mounted on said support and provided with a vertical shaft extending through said aperture, a screw centrally disposed on the upper end of said shaft, a nut adapted to cooperate with said screw and clamp the circular chart to the upper end of said vertical shaft, a protrusion on said nut adapted to fit snugly within the central aperture of said circular chart, and a hand-rest pivoted to said support and adapted to swing across the surface of said plate.

EARL R. BURGHER.